(12) United States Patent
Pagano (10) Patent No.: US 11,015,667 B2
(45) Date of Patent: May 25, 2021

(54) BRAKE MOUNTING BRACKET (71) Applicant: Michael Pagano, Grosse Point Farms, MI (US)

(72) Inventor: Michael Pagano, Grosse Point Farms, MI (US)

(*) Notice: Subject to any disclaimer, the term of this patent is extended or adjusted under 35 U.S.C. 154(b) by 72 days.

(21) Appl. No.: 16/424,081

(22) Filed: May 28, 2019

(65) Prior Publication Data

US 2020/0378458 A1  Dec. 3, 2020

(51) Int. Cl.
*F16D 65/095* (2006.01)
*F16D 65/092* (2006.01)
*F16D 65/00* (2006.01)
F16D 55/00 (2006.01)
F16D 65/02 (2006.01)

(52) U.S. Cl.
CPC ....... *F16D 65/092* (2013.01); *F16D 65/0068* (2013.01); *F16D 65/095* (2013.01); *F16D 2055/0008* (2013.01); *F16D 2065/026* (2013.01)

(58) Field of Classification Search
CPC .... F16D 65/092; F16D 65/095; F16D 65/056; F16D 65/0062; F16D 2055/0008; F16D 2055/0012
USPC ................................ 188/73.31, 73.39, 73.46
See application file for complete search history.

(56) References Cited

U.S. PATENT DOCUMENTS

| | | | | |
|---|---|---|---|---|
| 3,053,350 A * | 9/1962 | Lowey | ................. | F16D 65/827 188/218 R |
| 3,907,081 A * | 9/1975 | Smith | ..................... | F16D 55/02 188/73.46 |
| 4,717,170 A * | 1/1988 | Mounier-Poulat | ....... | B60G 9/00 180/24.01 |
| 5,826,682 A * | 10/1998 | Goettker | ............. | F16D 55/2265 188/72.4 |
| 6,234,278 B1 * | 5/2001 | Loken | ..................... | B60T 1/067 188/70 R |
| 6,354,408 B1 * | 3/2002 | Bailey | ..................... | B60T 1/065 188/73.39 |
| 6,488,132 B2 * | 12/2002 | Matsuishi | ............... | B60T 1/065 188/72.6 |
| 6,729,444 B1 | 5/2004 | Schmandt et al. | | |
| 7,708,124 B1 * | 5/2010 | Rackers | .................. | B60B 35/16 188/250 F |
| 8,307,958 B2 * | 11/2012 | Drewes | .................... | F16D 55/22 188/73.39 |

(Continued)

OTHER PUBLICATIONS

International Search Report (PCT/ISA/210) issued in PCT Application No. PCT/US2020/034647 dated Aug. 4, 2020 (three (3) pages).

(Continued)

*Primary Examiner* — Thomas J Williams (74) *Attorney, Agent, or Firm* — Crowell & Moring LLP (57) ABSTRACT

A brake mounting bracket mountable onto a trailing arm or a steering knuckle in a vehicle is provided. The bracket includes a first bracket mounting hole via which the bracket is mounted onto the trailing arm or the steering knuckle. The bracket includes at least one second bracket mounting hole via which a parking brake assembly is mounted to the bracket. The bracket includes at least one caliper mounting hole via which a brake caliper is mounted to the bracket. A vehicle including such a brake mounting bracket is also provided.

18 Claims, 7 Drawing Sheets

(56) References Cited

U.S. PATENT DOCUMENTS

| | | | | |
|---|---|---|---|---|
| 2009/0008194 | A1* | 1/2009 | Redemann | F16D 55/224 |
| | | | | 188/73.32 |
| 2009/0314593 | A1 | 12/2009 | Schmandt et al. | |
| 2010/0032250 | A1 | 2/2010 | Cantoni et al. | |
| 2013/0075180 | A1* | 3/2013 | Hombo | B62K 25/283 |
| | | | | 180/227 |
| 2015/0224969 | A1 | 8/2015 | Huennekens et al. | |
| 2015/0291250 | A1* | 10/2015 | Nagai | B62L 1/00 |
| | | | | 188/71.1 |
| 2016/0131207 | A1 | 5/2016 | Morais et al. | |
| 2018/0086415 | A1* | 3/2018 | Inase | B62K 25/283 |
| 2020/0378458 | A1* | 12/2020 | Pagano | F16D 65/0068 |

OTHER PUBLICATIONS

Written Opinion (PCT/ISA/237) issued in PCT Application No. PCT/US2020/034647 dated Aug. 4, 2020 (five (5) pages).

SRS Concept, product website "E36/E46 Twin Calipers Adapter V2 (weld-on)", https://srs-concept.com/product/e36e46-twin-calipers-adapter-v2-weld/ Date Accessed: May 21, 2019.

IRP, Individual Racing Parts, product website, IRP Shop, "Rear Second Caliper Bracket (adapter) (not BMW E46 M3, rear calipers BMW E39)", This solution requires of the hub and axle, as the ring is not large enough to slip over the hub. https://www.irp.it/individual-racing-parts-product/rear-second-caliper-adapter-not-m3-calipers-rear-e39/ Date Accessed: May 21, 2019.

* cited by examiner

BRAKE MOUNTING BRACKET

BACKGROUND AND SUMMARY OF THE INVENTION

The present application relates to a brake mounting bracket, and in particular to a brake mounting bracket mountable onto a trailing arm or a steering knuckle in a vehicle. The present application also relates to a vehicle including such a brake mounting bracket.

A dual caliper bracket kit, also known as a secondary caliper kit, is used to lock or slow down wheels of a vehicle, often rear wheels only. The secondary calipers on such a dual caliper bracket kit are on a separate hydraulic circuit, commonly used with a handbrake inside the cabin of the vehicle. Use of such calipers are particularly useful in the sport of drifting.

Drifting is a driving technique where the driver intentionally oversteers, with loss of traction in the rear wheels or all tires, while maintaining control and driving the car through the entirety of a corner. The drift initiation is often accomplished by locking the rear wheels and sliding and then overpowering the tires to drift sideways and create as much smoke as possible. Drifting is also popular in rally stage racing, where poor conditions such as gravel or ice make a car's maneuver difficult. By pulling the handbrake in tight corners, the driver can better maneuver around the course.

A bracket in a conventional dual caliper bracket kit needs to be welded or fabricated (e.g., machined) to be mounted (or installed) onto a vehicle. Further, an axle or a wheel hub needs to be removed from the vehicle in order to mount such a bracket in the vehicle. Removal of the wheel hub often ruins the wheel bearing such that the wheel bearing needs to be replaced. Thus, conventional dual caliper bracket kits require significant installation time and/or labor & component costs for installation of the bracket onto the vehicle.

In view of the foregoing, it is an objective of the present invention to provide new brake mounting brackets that render installation of the brackets onto the vehicle possible without the need for additional welding or fabrication operation. Further, an axle or a wheel hub does not need to be removed from the vehicle in order to mount such a bracket onto the vehicle according to embodiments of the invention.

In accordance with one aspect of the present invention, a brake mounting bracket mountable onto a trailing arm or a steering knuckle in a vehicle is provided. The bracket includes a first bracket mounting hole via which the bracket is mounted onto the trailing arm or the steering knuckle. The bracket also includes at least one second bracket mounting hole via which a parking brake assembly is mounted to the bracket. The bracket also includes at least one caliper mounting hole via which a brake caliper is mounted to the bracket.

Preferably, the first bracket mounting hole, the at least one second bracket mounting hole, and the at least one caliper mounting hole each form internally threaded bores. The internally threaded bores are configured to receive corresponding bolts. In this way, the bracket is mountable onto the trailing arm or the steering knuckle in the vehicle only by way of bolted connections.

In accordance with another aspect of the present invention, a brake mounting bracket mountable onto a trailing arm or a steering knuckle in a vehicle is provided. The bracket includes a first bracket mounting connection via which the bracket is mounted onto the trailing arm or the steering knuckle. The bracket also includes a second bracket mounting connection via which a parking brake assembly is mounted to the bracket. The bracket also includes a caliper mounting connection via which a brake caliper is mounted to the bracket.

In accordance with another aspect of the present invention, a vehicle including a brake mounting bracket according to embodiments of the invention mounted onto a trailing arm or a steering knuckle of the vehicle is provided. A parking brake assembly and a brake caliper are mounted to the bracket.

Other objects, advantages and novel features of the present invention will become apparent from the following detailed description of the invention when considered in conjunction with the accompanying drawings.

DETAILED DESCRIPTION OF THE DRAWINGS

A brake mounting bracket mountable (or installable) in a vehicle is provided. The brake mounting bracket may include one or more mounting connections in the form of, for example, a mounting hole, a mounting recess, a mounting bar, a mounting pin, a mounting strap, a mounting bolt, a mounting screw, etc., or any combination thereof. The brake mounting bracket may be installed in the vehicle via one or more of the mounting connections. Preferably, the brake mounting bracket is mountable onto a trailing arm or a steering knuckle of a vehicle via at least three mounting connections. Preferably, one or more of such mounting connections on the brake mounting bracket are not for permanently fixing the bracket to the vehicle (e.g., by way of welding). Preferably, one or more of such mounting connections on the brake mounting bracket are by way of detachable (or removable) connection(s) (e.g., bolt connection(s)).

Figure 1A:
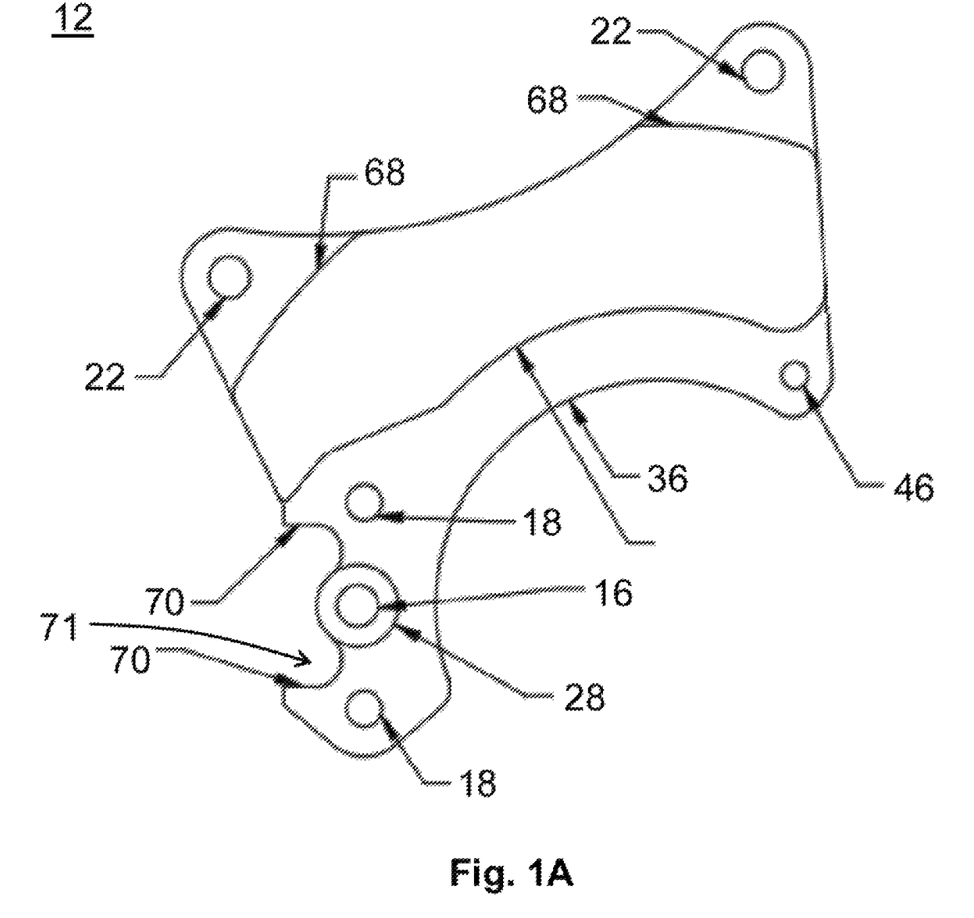
FIG. 1A is a front view of a brake mounting bracket mountable onto a trailing arm or a steering knuckle in a vehicle in accordance with an exemplary embodiment of the present application.
Figure 1B:
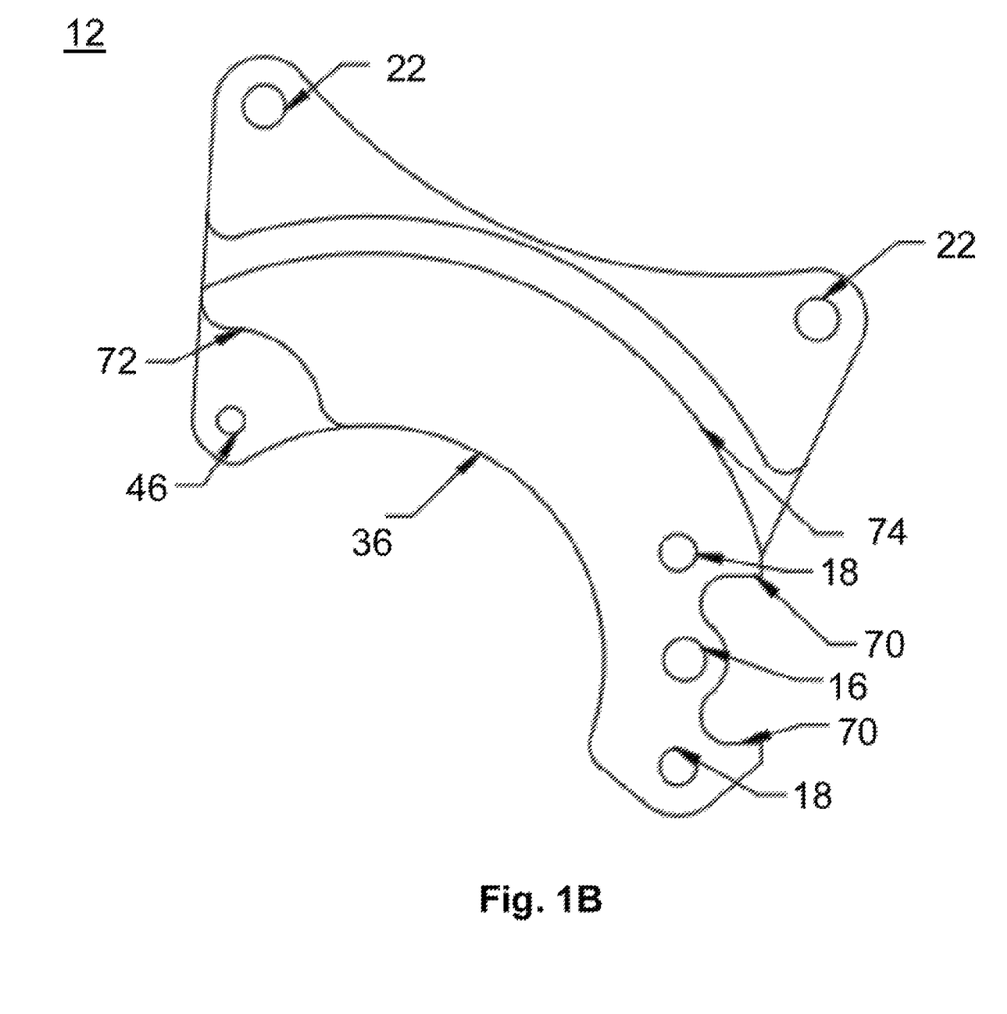
FIG. 1B is a rear view of the brake mounting bracket mountable onto the trailing arm or the steering knuckle in the vehicle in accordance with the exemplary embodiment of the present application.
Figure 1C:
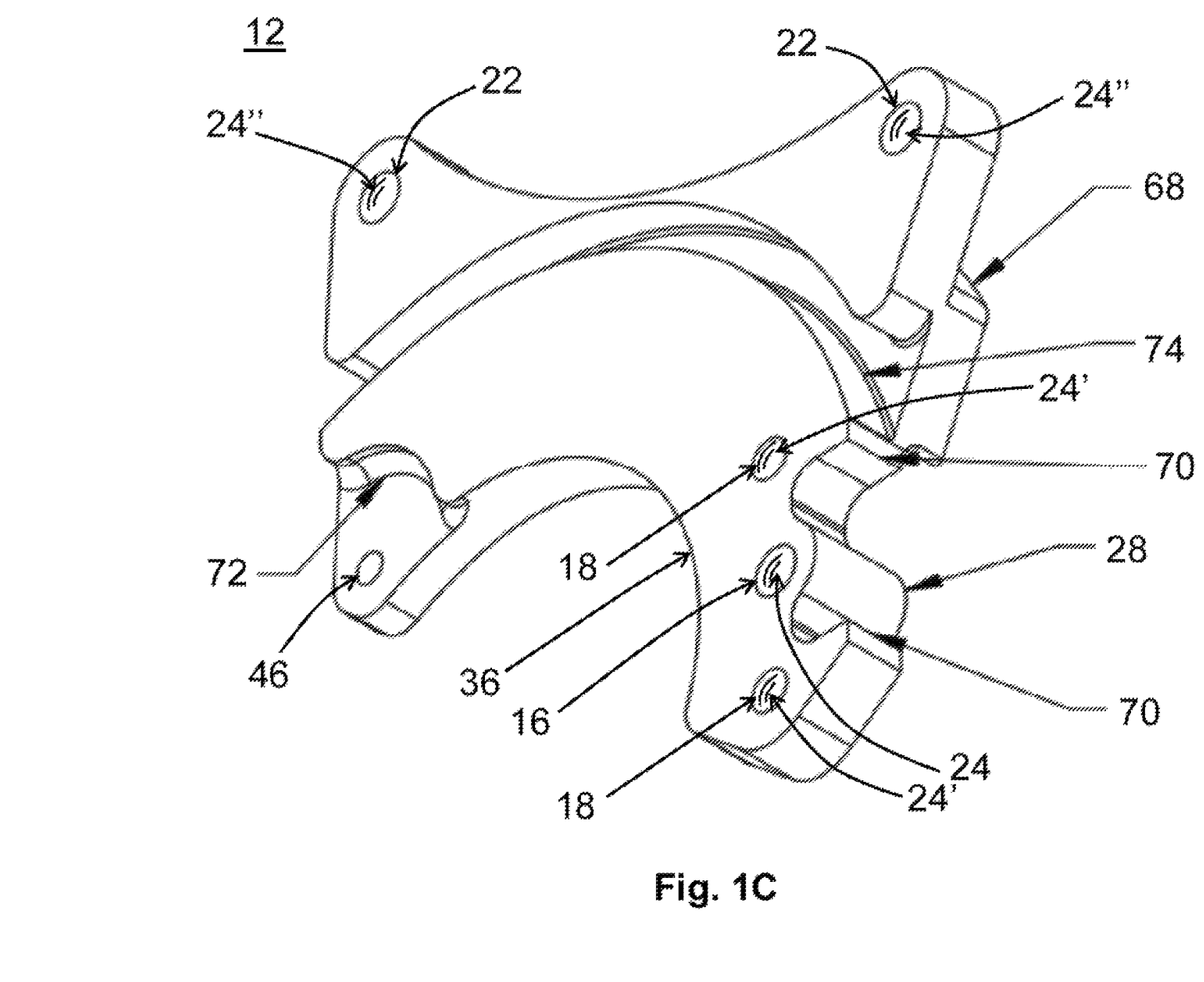
FIG. 1C is a perspective view of the brake mounting bracket mountable onto the trailing arm or the steering knuckle in the vehicle in accordance with the exemplary embodiment of the present application.

FIG. 1A shows a front view of a brake mounting bracket 12 mountable onto a trailing arm 14 (shown in FIG. 3) in a vehicle 10 (shown in FIG. 5) according to an exemplary embodiment. FIG. 1B shows a rear view of the brake mounting bracket 12. FIG. 1C shows a perspective view of the brake mounting bracket 12 showing a rear side of the bracket 12. In a preferred embodiment, the brake mounting bracket 12 includes a plurality of mounting holes 16, 18, 22. The plurality of mounting holes 16, 18, 22 are each used to form or facilitate a connection with corresponding vehicular components in the vehicle 10. Preferably, the brake mounting bracket 12 includes at least three mounting holes 16, 18, 22 for forming or facilitating a connection with corresponding vehicular components in the vehicle 10.

It should be noted that while mounting connections in various embodiments of the present invention are illustrated in the form of mounting holes for explanatory purposes, mounting connections of the present invention are not limited to the mounting holes. For example, mounting connections may be in the form of, for example, mounting recesses, mounting bars, mounting pins, mounting straps, mounting bolts, mounting screws, etc., or any combination thereof. Preferably, such mounting connections on the brake mounting bracket are not for permanently fixing the bracket to the vehicle (e.g., by way of welding). Preferably, such mounting connections on the brake mounting bracket are by way of detachable (or removable) connection(s).

Referring to FIGS. 1A-1C, the brake mounting bracket 12 preferably includes at least three bracket mounting holes 16, 18, 22. The bracket 12 includes at least one first bracket mounting hole 16 via which the bracket 12 is mounted onto the trailing arm 14. The bracket 12 includes at least one second bracket mounting hole 18 via which a parking brake assembly 20 (shown in FIGS. 4 and 5) is mounted to the bracket 12. The bracket 12 includes at least one caliper mounting hole 22 via which a brake caliper 23 (shown in FIG. 3) is mounted to the bracket 12.

In the embodiment shown in FIGS. 1A-1C, the bracket 12 includes a single first bracket mounting hole 16, two second bracket mounting holes 18, 18, and two caliper mounting holes 22, 22. However, the bracket configuration of the present invention is not limited to the configuration shown in FIGS. 1A-1C. In other embodiments, the bracket 12 may include, for example, a single first bracket mounting hole, a single second bracket mounting hole, and two caliper mounting holes. Thus, it should be noted that the number of the respective mounting hole can vary without departing from the scope of the present invention.

In a preferred embodiment, at least one of the first bracket mounting hole 16, the two second bracket mounting holes 18, 18, and the two caliper mounting holes 22, 22 forms an internally threaded bore 24, 24', 24". More preferably, each of the first bracket mounting hole 16, the two second bracket mounting holes 18, 18, and the two caliper mounting holes 22, 22 forms an internally threaded bore 24, 24', 24".

The respective internally threaded bore 24, 24', 24" of the first bracket mounting hole 16, the two second bracket mounting holes 18, 18, and the two caliper mounting holes 22, 22 may be configured to receive a corresponding bolt 51, 52, 53 (shown in FIGS. 3-4) to form a bolted connection 51', 52', 53' with a corresponding vehicular component. In particular, the bracket 12 is mounted to the trailing arm 14 via the bolted connection 51'; the parking brake assembly 20 is mounted to the bracket 12 via the bolted connection 52'; and the brake caliper 23 is mounted to the bracket 12 via the bolted connection 53'.

The bracket 12 may be made of aluminum, steel, plastic, composite material, or any other suitable material. The bracket 12 (or a portion of the bracket 12) may be machined, welded, stamped, or manufactured by any other suitable manufacturing method.

The parking brake assembly 20 to be mounted to the bracket 12 via the bolted connection 52' may be a stock part. In a preferred embodiment, no additional welding or fabrication (e.g., machining) for the stock parking brake assembly 20 or the bracket 12 is needed to mount the parking brake assembly 20 to the bracket 12 via the bolted connection 52'. Similarly, no additional welding or fabrication (e.g., machining) for the trailing arm 14 or the bracket 12 is needed to mount the bracket 12 to the trailing arm 14 via the bolted connection 51'. Further, no additional welding or fabrication (e.g., machining) for the brake caliper 23 or the bracket 12 is needed to mount the brake caliper 23 to the bracket 12 via the bolted connection 53'. In this way, the bracket 12 is mountable onto the trailing arm 14 (or the steering knuckle) in the vehicle 10 without the need for additional welding or fabrication operation. In other words, the bracket 12 is fully "bolted-on" (i.e., the bracket 12 is mountable onto the trailing arm 14 (or the steering knuckle) in the vehicle 10 only by way of bolted connection) according to the preferred embodiment described above.

Figure 2:
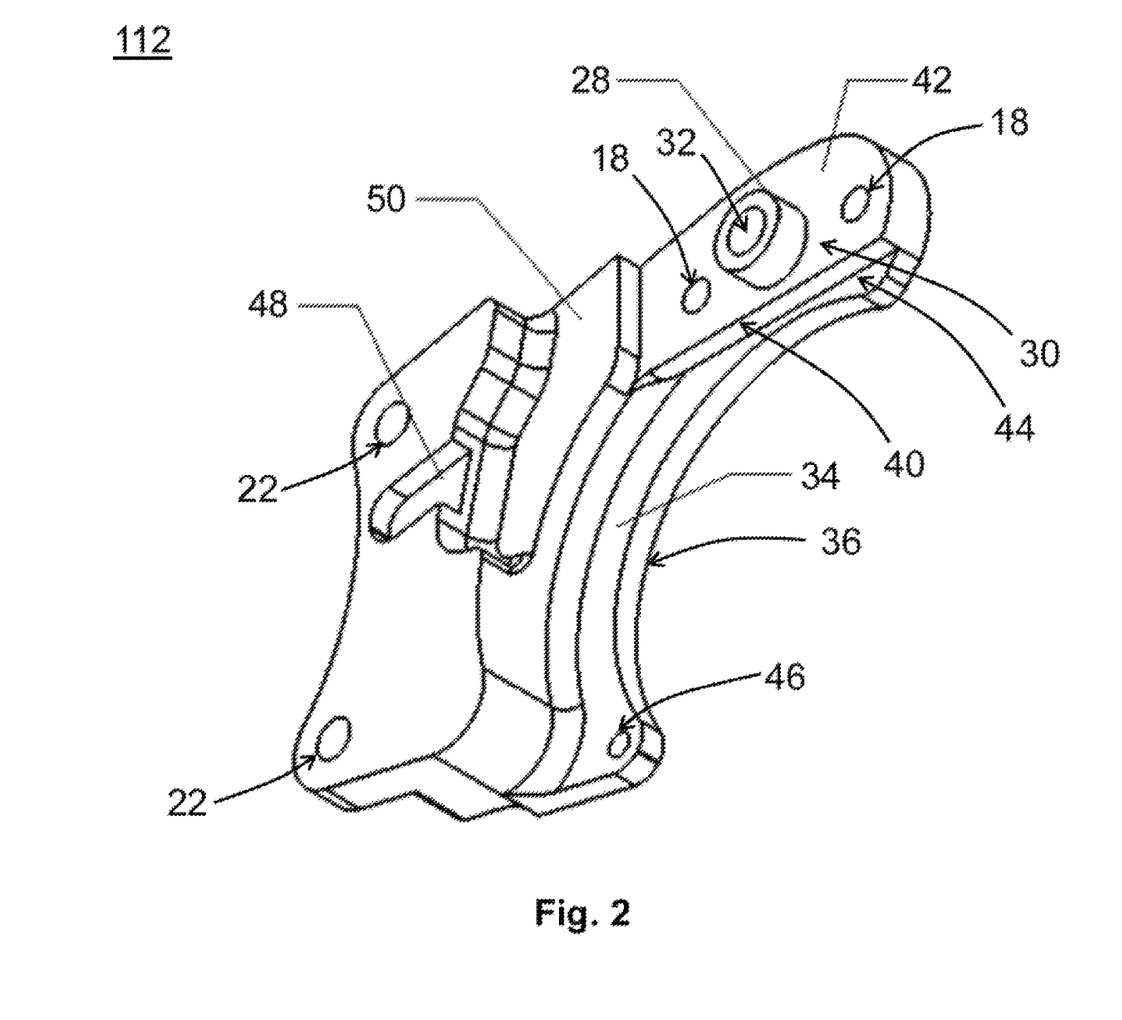
FIG. 2 is a perspective view of a brake mounting bracket mountable onto a trailing arm or a steering knuckle in a vehicle in accordance with another exemplary embodiment of the present application.

FIG. 2 is a perspective view of the brake mounting bracket 112 mountable onto the trailing arm 14 (or the steering knuckle) in the vehicle 10 in accordance with another exemplary embodiment of the present application. The difference between the bracket 112 shown in FIG. 2 and the above-described bracket 12 shown in FIGS. 1A-1C is that the bracket 112 does not include a cutout 71 of the bracket 12 illustrated in FIG. 1C. For some models, such a cutout 71 is included to provide a mating surface 70 for locating on a stock parking brake actuator boss. FIG. 2 shows a front side of both the bracket 12 and the bracket 112. Accordingly, the same reference numerals are used for both the bracket 12 and the bracket 112.

Referring to FIGS. 1A and 2, the bracket 12, 112 may include a first boss 28 extending from a first surface 30 of the bracket 12, 112, where the first boss 28 includes a through-hole 32 for a cable of the parking brake assembly 20. The first boss 28 may be round-shaped, but it can have any other shape. The round-shaped boss 28 may be formed concentrically with the first bracket mounting hole 16. The boss 28 may be disposed between the two second bracket mounting holes 18, 18.

As shown in FIGS. 1A-1C, 2 and 4, the bracket 12, 112 may include an arcuate portion 36 to accommodate a hub external surface 38 of the trailing arm 14. As shown in FIG. 2, the bracket 12, 112 may include a recessed surface 34 onto which the trailing arm 14 sits flush. The bracket 12, 112 may also include a ledge 40 for locating the bracket 12, 112 on the trailing arm 14. As shown in FIGS. 1B and 1C, the bracket 12, 112 may include a slot 74 for clearance of a stock protruded parking brake drum.

Referring to FIG. 2, the bracket 12, 112 may include a second boss 42 extending from a second surface 44 of the bracket 12, 112, where the second boss 42 is configured to accommodate an actuator recess of the parking brake assembly 20. The first and second mounting bracket holes 16, 18 may be formed through the second boss 42.

Referring to FIGS. 1A-1C, 2, and 4, the bracket 12, 112 may include at least one third bracket mounting hole 46 via which a heat shield 47 is mounted to the bracket 12, 112. The third bracket mounting hole 46 may form an internally threaded bore and be configured to receive a corresponding bolt 54 (shown in FIG. 4) to form a bolted connection 54' with the heat shield 47.

The diameter of the third bracket mounting hole 46 may be smaller than the diameter of the first bracket mounting hole 16, the second bracket mounting holes 18, 18, or the caliper mounting holes 22, 22. For example, the third bracket mounting hole 46 is configured for M6 bolt (i.e., 6 mm-diameter bolt); the second bracket mounting holes 18, 18 are configured for M8 bolt (i.e., 8 mm-diameter bolt); and the first bracket mounting hole 16 and the caliper mounting holes 22, 22 are configured for M10 bolt (i.e., 10 mm-diameter bolt).

The bracket 12, 112 may include one or more stress-reducing recesses. Referring to FIGS. 1B-1C, the bracket 12, 112 may include a stress-reducing recess 72 adjacent to the third bracket mounting hole 46. This stress-reducing recess 72 is provided, for example, to add compliance to a bolt joint with a smaller diameter.

The bracket 12, 112 may include one or more recesses for a wheel speed sensor. For example, the bracket 12, 112 may include a first recess 48 for a stock wheel speed sensor and a second recess 50 for the base of the stock wheel speed sensor.

The bracket 12, 112 of the present application may be used for multiple vehicle models as long as the vehicular configuration where the bracket 12, 112 is installed in the vehicles is compatible with the design of the bracket 12, 112. The bracket 12, 112 may be installed onto a factory trailing arm or steering knuckle using the threaded bores that are originally designated for the factory original cable operated handbrake assembly. The bracket 12, 112 may use parts of the hub for support and to reduce the force applied to the bolts.

Figure 3:
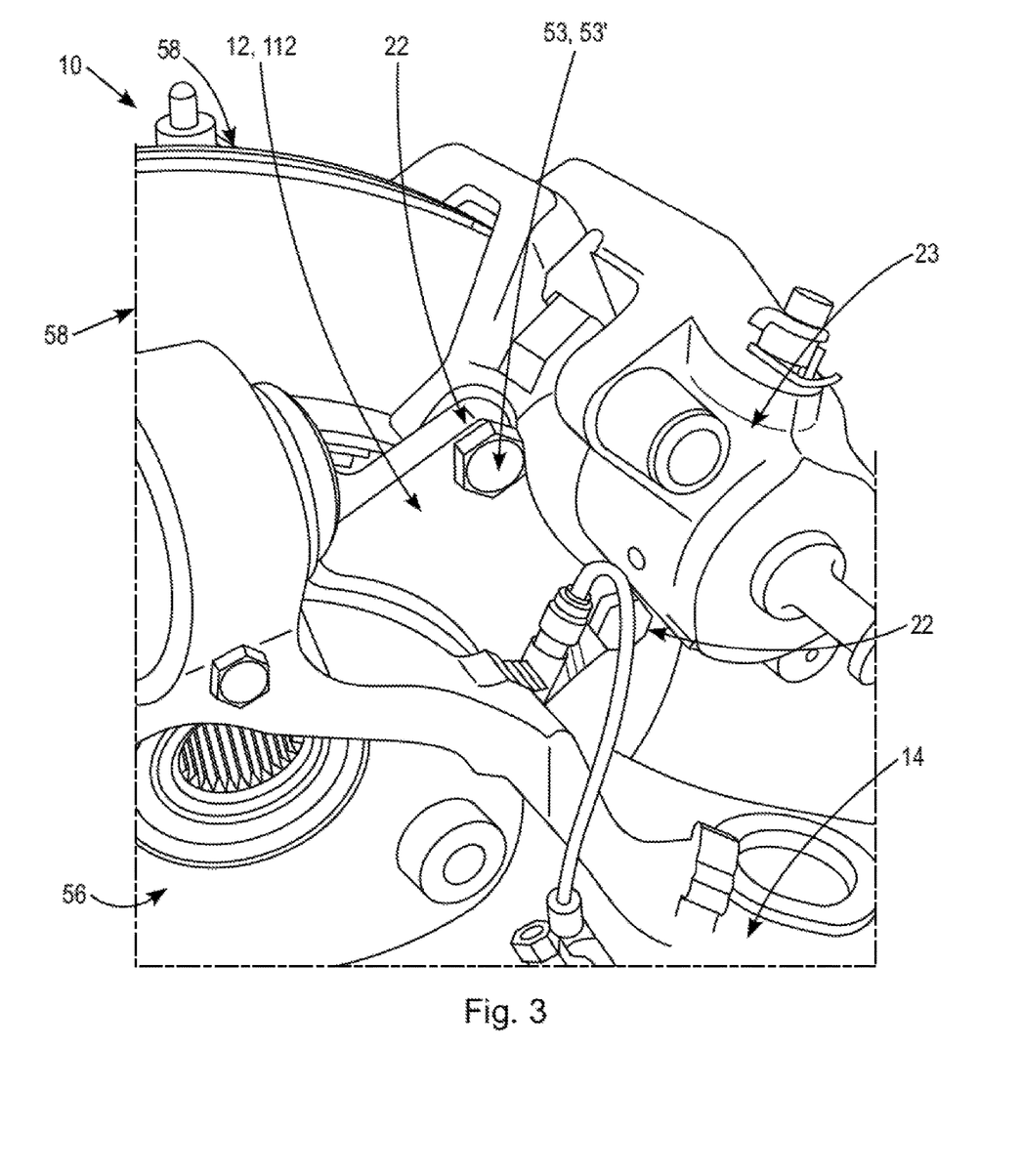
FIG. 3 is a schematic view illustrating a brake mounting bracket mounted onto a trailing arm in a vehicle in accordance with an exemplary embodiment of the present application.
Figure 4:
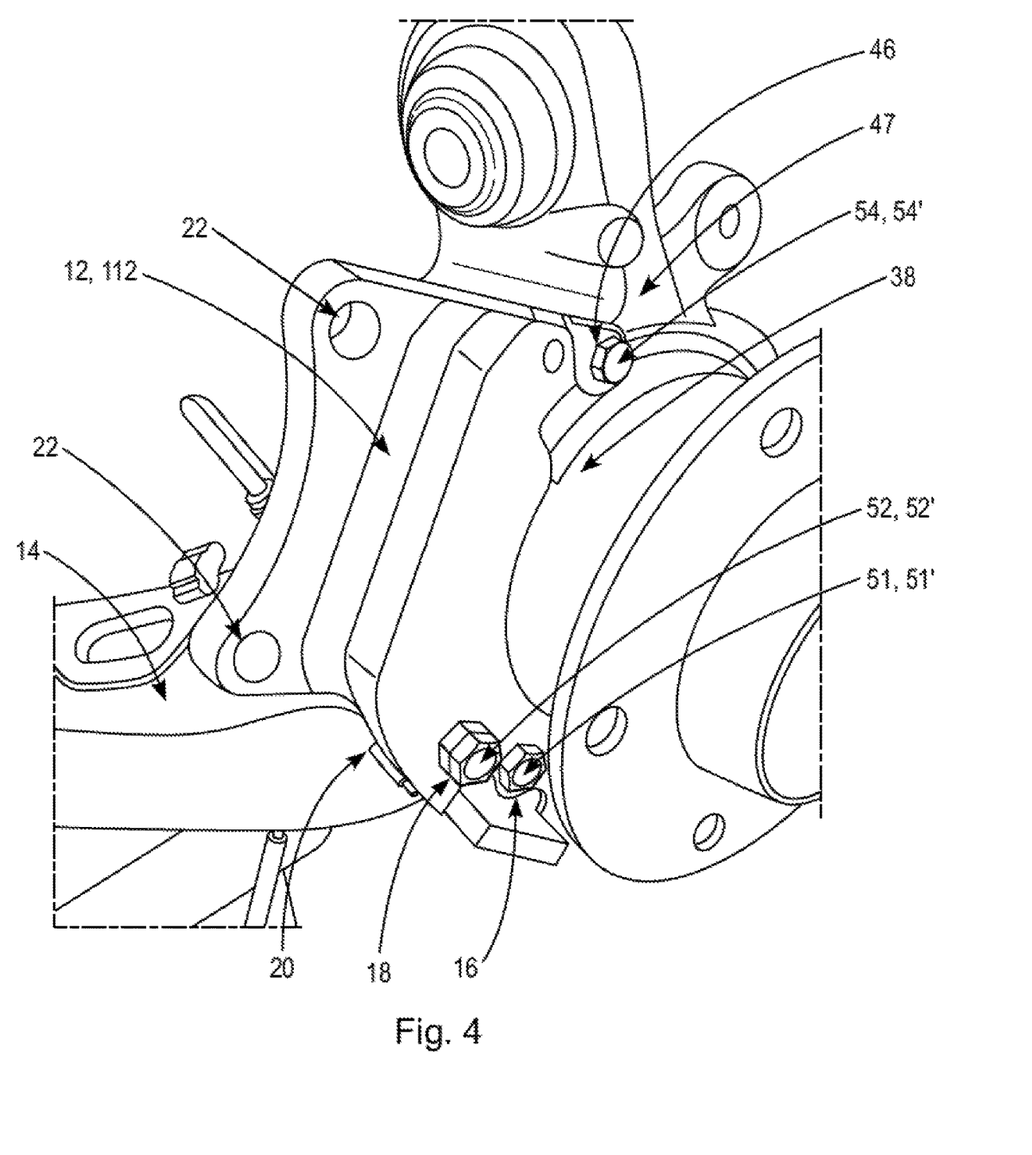
FIG. 4 is another schematic view illustrating the brake mounting bracket mounted onto the trailing arm in the vehicle in accordance with the exemplary embodiment of the present application.

FIG. 3 is a schematic view illustrating a brake mounting bracket 12, 112 mounted to the trailing arm 14 in the vehicle 10 in accordance with an exemplary embodiment of the present application. In particular, FIG. 3 schematically illustrates an assembly state after the brake caliper 23 is mounted onto the bracket 12, 112. FIG. 4 is another schematic view illustrating the brake mounting bracket 12, 112 mounted to the trailing arm 14 in the vehicle 10 in accordance with the exemplary embodiment of the present application. In particular, FIG. 4 schematically illustrates an assembly state before the brake caliper 23 is mounted onto the bracket 12, 112. As shown in FIGS. 1A and 1C, the bracket 12, 112 may include a recess 68 to accommodate the brake caliper 23 therein.

As described above, the bracket 12, 112 according to the invention is mountable onto the trailing arm 14 (or a steering knuckle) in the vehicle 10 without the need for additional welding or fabrication operation. In other words, the bracket 12, 112 is fully "bolted-on" (i.e., the bracket 12, 112 is mountable onto the trailing arm 14 (or the steering knuckle) in the vehicle 10 only by way of bolted connections 51', 52', 53', 54', as shown in FIGS. 3-4). Further, the bracket 12, 112 is mountable onto the trailing arm 14 (or the steering knuckle) in the vehicle 10 without the need for removal of an axle (not shown) or a wheel hub 56 from the vehicle 10.

Figure 5:
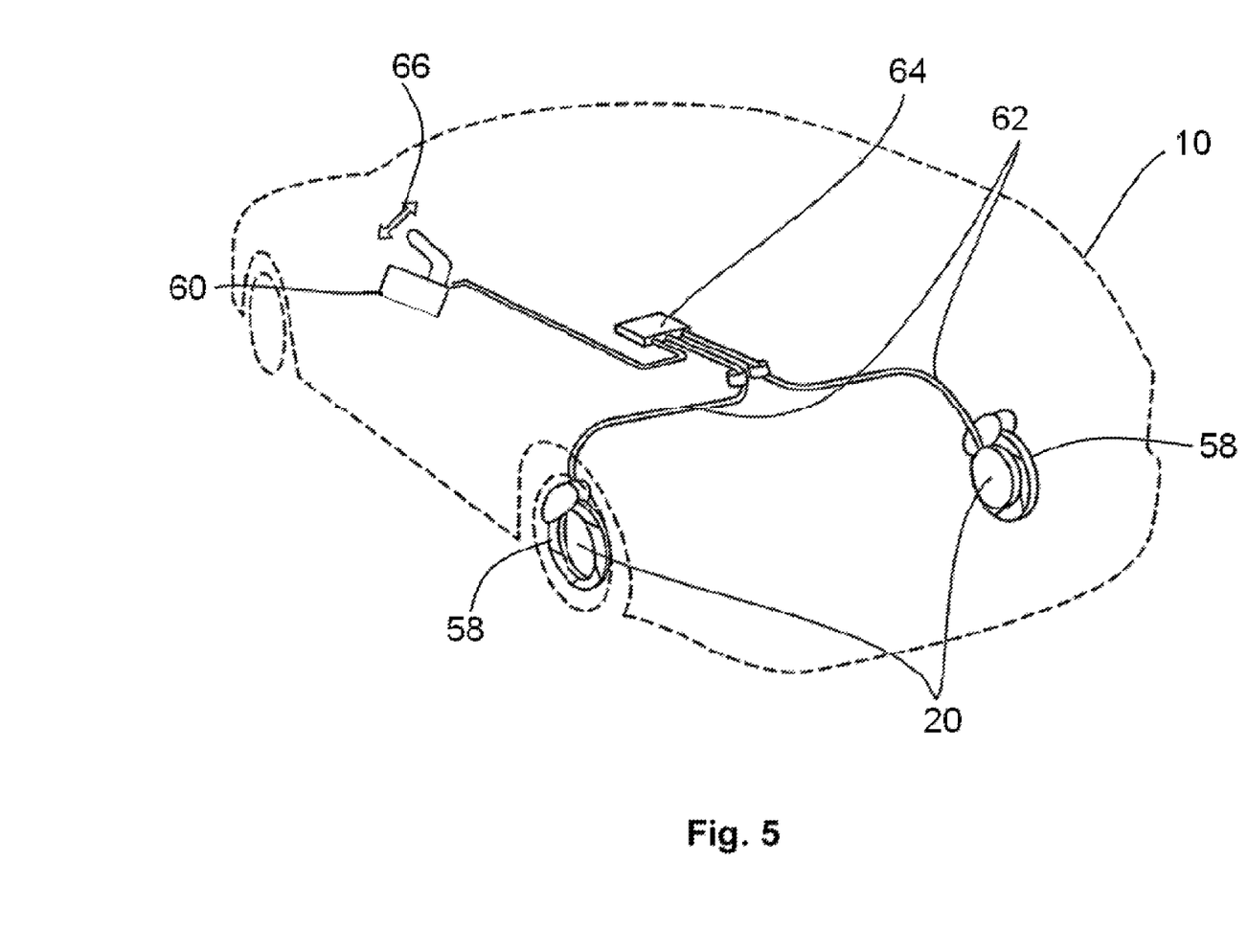
FIG. 5 is a schematic view illustrating a vehicle onto which a brake mounting bracket is mountable.

FIG. 5 is a schematic view illustrating the vehicle 10 onto which the brake mounting bracket 12, 112 is mountable. As shown in FIGS. 3 and 5, the vehicle 10 includes the trailing arm 14 (or a steering knuckle), the brake mounting bracket 12, 112 mounted onto the trailing arm 14 (or the steering knuckle), the parking brake assembly 20 mounted to the bracket 12, 112, and the brake caliper 23 mounted to the bracket 12, 112. The bracket 12, 112 is preferably mounted to rear wheels 58 of the vehicle 10.

The brake caliper 23 may be configured such that it is used to control the rear wheels 58 for drifting of the vehicle 10. A parking brake of the parking brake assembly 20 may be a handbrake 60. An actuator unit 64 including a parking brake cable 62 in combination with a controller (not shown) may be used to control the brake caliper 23. A driver of the vehicle 10 may control the drifting of the vehicle 10 by way of applying or releasing 66 brake force via the handbrake 60. The parking brake assembly 20 is preferably a stock part. Various types of control systems for stock parking brake assemblies are known in the art, and thus a detailed description thereof is omitted herein.

In the embodiments described above, the brake mounting brake and/or the vehicle including the brake mounting brake can be used for the purposes of drifting operation. However, the brake mounting brake and/or the vehicle including the brake mounting brake of the present invention is not limited to such use. The brake mounting brake and/or the vehicle including the brake mounting brake of the present invention is applicable to any vehicular brake system for other purposes without departing from the spirit and scope of the present invention.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

What is claimed is:

1. A brake mounting bracket mountable onto a trailing arm or a steering knuckle in a vehicle, the bracket comprising:
    a first bracket mounting hole via which the bracket is mounted onto the trailing arm or the steering knuckle;
    at least one second bracket mounting hole via which a parking brake assembly is mounted to the bracket;
    at least one caliper mounting hole via which a brake caliper is mounted to the bracket;
    a third bracket mounting hole via which a heat shield is mounted to the bracket; and
    a stress-reducing recess provided adjacent to the third bracket mounting hole.

2. The bracket according to claim 1, wherein
    the first bracket mounting hole, the at least one second bracket mounting hole, and the at least one caliper mounting hole each form internally threaded bores.

3. The bracket according to claim 2, wherein
    the internally threaded bores are configured to receive corresponding bolts.

4. The bracket according to claim 1, further comprising:
    a first boss extending from a first surface of the bracket, wherein the first boss includes a through-hole for a cable of the parking brake assembly.

5. The bracket according to claim 1, further comprising:
    a recessed surface onto which the trailing arm sits flush.

6. The bracket according to claim 1, further comprising:
    an arcuate portion to accommodate a hub external surface of the trailing arm.

7. The bracket according to claim 1, further comprising:
    a ledge for locating the bracket on the trailing arm.

8. The bracket according to claim 1, further comprising:
    a second boss extending from a second surface of the bracket, wherein the second boss is configured to accommodate an actuator recess of the parking brake assembly.

9. The bracket according to claim 1, wherein
    a diameter of the third bracket mounting hole is smaller than a diameter of the first bracket mounting hole, the at least one second bracket mounting hole, or the at least one caliper mounting hole.

10. The bracket according to claim 1, further comprising:
a recess for a wheel speed sensor.

11. The bracket according to claim 1, wherein
the bracket is mountable onto the trailing arm or the steering knuckle in the vehicle without the need for welding or fabrication operation.

12. The bracket according to claim 1, wherein
the bracket is mountable onto the trailing arm or the steering knuckle in the vehicle only by way of bolted connection.

13. The bracket according to claim 1, wherein
the bracket is mountable onto the trailing arm or the steering knuckle in the vehicle without the need for removal of an axle or a wheel hub from the vehicle.

14. A vehicle comprising:
a trailing arm or a steering knuckle;
a brake mounting bracket according to claim 1 that is mounted onto the trailing arm or the steering knuckle in the vehicle.

15. The vehicle according to claim 14, wherein
the bracket is mounted on a rear wheel of the vehicle.

16. The vehicle according to claim 15, wherein
the brake caliper is configured to control the rear wheel for drifting of the vehicle.

17. The vehicle according to claim 14, wherein
a parking brake of the parking brake assembly is a handbrake.

18. A brake mounting bracket mountable onto a trailing arm or a steering knuckle in a vehicle, the bracket comprising:
a first bracket mounting connection via which the bracket is mounted onto the trailing arm or the steering knuckle;
a second bracket mounting connection via which a parking brake assembly is mounted to the bracket;
a caliper mounting connection via which a brake caliper is mounted to the bracket;
a third bracket mounting hole via which a heat shield is mounted to the bracket; and
a stress-reducing recess provided adjacent to the third bracket mounting hole.

\* \* \* \* \*